US009225757B2

(12) United States Patent
Jagannathan et al.

(10) Patent No.: US 9,225,757 B2
(45) Date of Patent: Dec. 29, 2015

(54) TREE-BASED BROADCASTING SERVICE OVER PUSH-TO-TALK MOBILE IP NETWORK

(75) Inventors: Sankarnarayan Jagannathan, Bangalore (IN); Vishal Gupta, Bangalore (IN)

(73) Assignee: Intel Mobile Communications GmbH, Neubiberg (DE)

( * ) Notice: Subject to any disclaimer, the term of this patent is extended or adjusted under 35 U.S.C. 154(b) by 2922 days.

(21) Appl. No.: 11/370,199

(22) Filed: Mar. 6, 2006

(65) Prior Publication Data

US 2007/0208807 A1    Sep. 6, 2007

(51) Int. Cl.
*G06F 15/16* (2006.01)
*H04L 29/06* (2006.01)

(52) U.S. Cl.
CPC ........ *H04L 65/4061* (2013.01); *H04L 65/1016* (2013.01); *H04L 65/403* (2013.01)

(58) Field of Classification Search
USPC .................. 709/204, 206, 200, 224
See application file for complete search history.

(56) References Cited

U.S. PATENT DOCUMENTS

| | | | |
|---|---|---|---|
| 6,982,961 B2 * | 1/2006 | Refai et al. | 370/265 |
| 2006/0250987 A1 * | 11/2006 | White et al. | 370/260 |
| 2007/0106724 A1 * | 5/2007 | Gorti et al. | 709/204 |
| 2007/0133438 A1 * | 6/2007 | Shaffer et al. | 370/260 |

* cited by examiner

*Primary Examiner* — El Hadji Sall
(74) *Attorney, Agent, or Firm* — Schiff Hardin LLP

(57) ABSTRACT

A method for generating a plurality of messages for inviting communication devices to a communication conference. The method includes
  establishing a first communication conference with a plurality of first communication devices,
  receiving a plurality of communication device identifiers from a communication device participating in the first communication conference, which communication device identifiers identify communication devices to be invited to at least a second communication conference,
  determining communication devices from the plurality of the communication devices, which are already involved in the first communication conference, and
  generating messages for inviting communication devices to the second communication conference only for those communication devices which are not involved in the first communication conference.

17 Claims, 9 Drawing Sheets

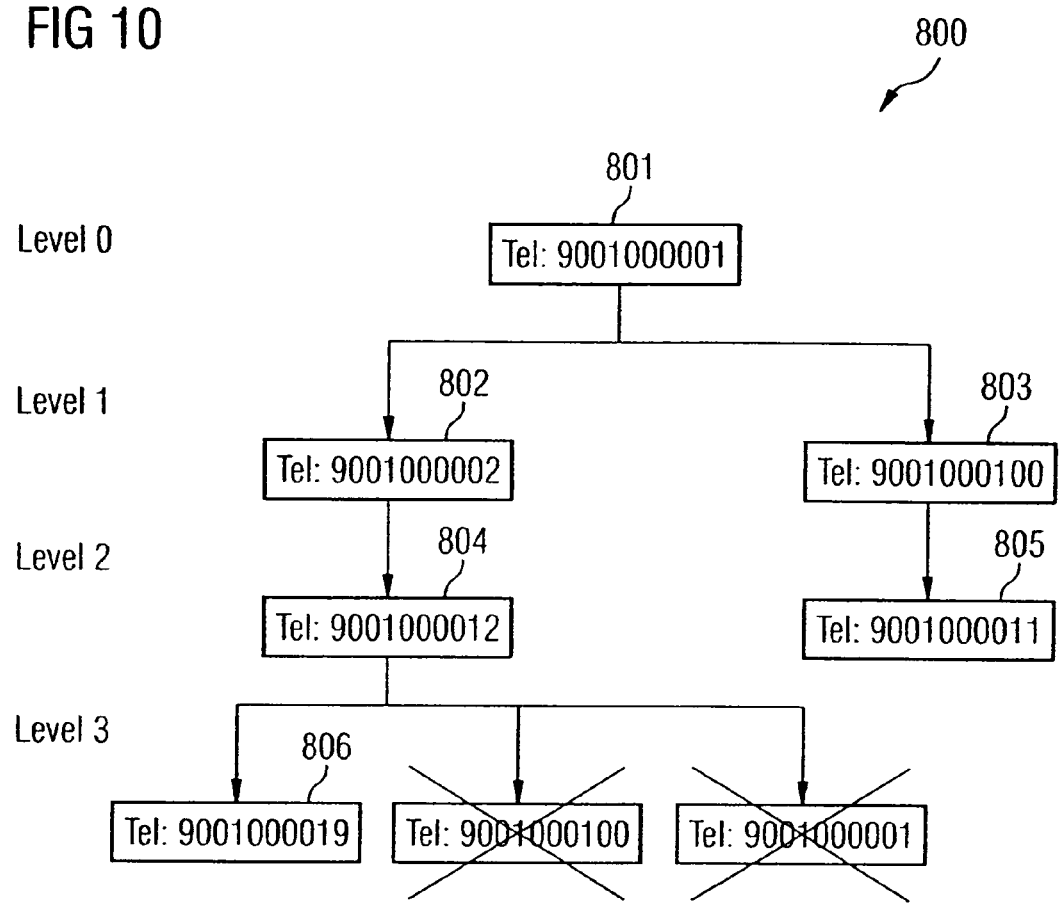

TREE-BASED BROADCASTING SERVICE OVER PUSH-TO-TALK MOBILE IP NETWORK

TECHNICAL FIELD

The invention relates generally to push-to-talk wireless communications, and more specifically to a method and a communications arrangement for setting up a broadcast communication on a push-to-talk communication link.

BACKGROUND OF THE INVENTION

Push-to-talk over Cellular (PoC), also referred to as "direct connect" is a service that permits a user or transmitter to transfer a voice message to one or more receivers simultaneously via a mobile telephone interface. Using PoC, the voice data is typically distributed over the mobile telephone communications network as the voice signal to be transmitted is spoken into the mobile telephone terminal by the user. From the user's point of view, using PoC is similar to using a CB radio or other similar device, but extended so that the transmitter can speak to receivers throughout the world, which can be reached via the switching technology of at least one mobile telephone communications network.

Generally, a user selects the people with whom he wishes to talk from a list on his mobile device. Once all of the selections are made, the selected people receive invitations on their mobile devices, which they may accept or decline. When the participants have accepted their invitations, the initial caller may press a "Push-and-Talk" (PaT) button on his mobile device to start the conversation, which is heard by all of the participants substantially simultaneously. Any participant in the call may reply immediately by pressing the PaT button, and speaking. Generally, communication can only go in one direction, so only one participant may speak at any given time. This is known as a half duplex call. Typically, whoever presses the PaT button first has the ability to talk for as long as the PaT button is held.

This mobile voice chat capability supplements SMS and eliminates some of the cumbersome steps required to set up a conference call. It is expected that this PoC service will replace the radio communications systems used by freight forwarders, courier services, taxi companies, building contractors, and others.

Push to talk supports three kinds of calls: "Point to Point Call" in which a user can call single contact at a time; "Group Call" in which the group is a collection of contacts stored by a unique name in handset (a single group can be called using this feature, and the maximum number of contacts in a group is a configurable parameter); and "Adhoc Call" in which a user can call any number of groups and contacts together, and in which the maximum number of contacts allowed is again a configurable parameter.

In this context it should be noted that the term communication conference used in this document e.g. specifies a Group Call or an Adhoc Call which are half duplex in nature.

In many PoC systems, a standard protocol, known as Session Initiation Protocol (SIP) is used to set up a PoC communication link. SIP messages are sent from a client to a server, for the purpose of invoking particular operations. The server returns response codes to indicate the status of an operation to the client. In PoC systems a mobile phone always act as a SIP client as it always initiates request.

SIP requests and responses include header information that is used to identify and route requests and responses. This header information includes a "From" field that identifies the sender, a "To" field that identifies the intended recipient, a "Call-ID" field that identifies the call to which the message belongs, a "Cseq" field that contains a sequence number that is used for ordering messages, and other fields.

Each user in a SIP network is identified by a unique SIP address, which has a format similar to an e-mail address, such as "02114204701@gateway-r-us.com". Addresses can also take the form of a "Tel:" URL for telephone numbers, such as "Tel:+0811797677". A user's SIP address is generally registered with a registrar server, which assists in locating users when a SIP message needs to be directed to them.

The standard requests in SIP are shown in Table 1. These requests may include a variety of parameters.

TABLE 1

SIP Requests

| Message | Function |
|---|---|
| INVITE | Used to invite a user or service to participate in a session. |
| ACK | Confirms that the client has received a final response to an INVITE request. |
| BYE | Indicates to the server that the client wishes to release the call. |
| CANCEL | Cancels a pending request with specified Call-ID, To, From, and Cseq field values, but does not affect a completed request. |
| REGISTER | Registers an address listed in a To header field with the SIP server. |
| OPTIONS | Queries the capabilities of the SIP server. |

It should be noted that the requests listed in Table 1 are only the requests defined in RFC 3261, which is distributed by the Internet Engineering Task Force (IETF), and defines the basic functionality of SIP. A variety of extensions also exist, some of which are standard, and some of which are proprietary. These extensions may include new SIP requests, such as the SUBSCRIBE and NOTIFY messages, which are used for specific event notification, and are defined in IETF RFC 3265.

Standard SIP responses take the form of three-digit numbers, with the first digit determining the type of response, and the next two digits determining the specific response that is being sent. For example, all "1xx" responses are informational, "2xx" responses indicate success, "3xx" responses indicate that further action needs to be taken, "4xx" responses indicate a client error, "5xx" responses indicate a server error, and "6xx" responses indicate a global failure. Examples of specific responses are "181", which indicates that a call is being forwarded, "200", which indicates that an operation status is "OK", and "503", which indicates that a service is unavailable. A more complete list of recognized SIP response codes can be found, for example, in IETF RFC 3261.

The Push-to-Talk standard specifications are split between the Open Mobile Alliance (OMA) standardization gremium and the 3rd Generation Partnership Project/3rd Generation Partnership Project 2 (3GPP/3GPP2) standardization gremiums.

For mobile devices, such as phones with a Push-to-talk capability, the SIP messages and responses, as well as other data are transmitted over a General Packet Radio Service (GPRS) network or a Universal Mobile Telecommunications System (UMTS) network.

In case that in an already established communication conference one of the participants wants to create a new conference, according to PoC, the communication device will generate a list of other communication devices that should be invited to this new communication conference within the already established communication conference and transmit this list to the SIP conference server within a SIP INVITE message. The communication devices that should be invited to the new communication conference can be assigned individually by means of an individual communication device identifier or group-wise using predefined groups of a plurality of communication devices. The conference server would then generate a SIP INVITE message for each communication device contained in the received list.

What is needed in the art is a more efficient management of communication conferences.

SUMMARY OF THE INVENTION

In accordance with a first aspect of the invention, there is a method for generating a plurality of messages for inviting communication devices to a communication conference is provided. The method includes establishing a first communication conference with a plurality of first communication devices, receiving a plurality of communication device identifiers from a communication device participating in the first communication conference, which communication device identifiers identify communication devices to be invited to at least a second communication conference, determining communication devices from the plurality of the communication devices, which are already involved in the first communication conference, and generating messages for inviting communication devices to the second communication conference only for those communication devices which are not involved in the first communication conference.

In accordance with another aspect of the invention, there is a method for generating a plurality of messages for inviting communication devices to a communication conference is provided. This method includes the steps of receiving a plurality of communication device identifiers, which identify the communication devices to be invited to a second communication conference, determining communication devices from the plurality of the communication devices, which are already involved in a first communication conference, and generating of messages for inviting communication devices to the second communication conference only for those communication devices which are not involved in the first communication conference. In accordance with yet another aspect of the invention, there is a method for generating a communication conference tree used for inviting communication devices to a communication conference is provided. This method includes initializing the communication conference tree with a root node communication device identifier that identifies a communication device that participates in a first communication conference, providing a plurality of communication device identifiers of communication devices which are to be invited to at least one second communication conference, removing each of the provided plurality of communication device identifiers which is already present in the communication conference tree, and adding each of the non-removed communication device identifiers to a communication conference tree next level buffer.

In accordance with yet another aspect of the invention, there is a device for generating a plurality of messages for inviting communication devices to a communication conference is provided. The device includes a communication conference establishing unit establishing a first communication conference with a plurality of first communication devices, a receiver receiving a plurality of communication device identifiers from a communication device participating in the first communication conference, which communication device identifiers identify communication devices to be invited to at least a second communication conference, a determination unit determining communication devices from the plurality of the communication devices, which are already involved in the first communication conference, and a message generating unit generating messages for inviting communication devices to the second communication conference only for those communication devices which are not involved in the first communication conference.

In accordance with yet another aspect of the invention, there is a device for generating a plurality of messages for inviting communication devices to a communication conference. The device includes a means for establishing a first communication conference with a plurality of first communication devices, a means for receiving a plurality of communication device identifiers from a communication device participating in the first communication conference, which communication device identifiers identify communication devices to be invited to at least a second communication conference, a means for determining communication devices from the plurality of the communication devices, which are already involved in the first communication conference, and a means for generating messages for inviting communication devices to the second communication conference only for those communication devices which are not involved in the first communication conference.

In accordance with yet another aspect of the invention, there is a device for generating a plurality of messages for inviting communication devices to a communication conference is provided. This device includes a receiver receiving a plurality of communication device identifiers, which identify the communication devices to be invited to a second communication conference, a determination unit determining communication devices from the plurality of the communication devices, which are already involved in a first communication conference, and a message generating unit generating messages for inviting communication devices to the second communication conference.

In accordance with yet another aspect of the invention, there is a device for generating a plurality of messages for inviting communication devices to a communication conference is provided. This device includes a means for receiving a plurality of communication device identifiers, which identify communication devices to be invited to a communication conference, a means for determining communication devices from the plurality of the communication devices, which are already involved in a first communication conference, and a means for generating messages for inviting communication devices to the second communication conference only for those communication devices which are not involved in another communication conference.

One advantage that can be had from the exemplary embodiments of the invention described herein can be seen in that no communication devices are invited and therefore no INVITE messages, for example, are generated for communication devices that are already participants of an already established communication conference. This achieves a better performance within the communication conference management.

These and other features, aspects and advantages of the invention can be appreciated from the Drawing Figures attached hereto and the accompanying Detailed Description of certain Embodiments of the invention.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows a communication conference tree after the establishment of a third push-to-talk communication conference in accordance with an exemplary embodiment of the invention.

DETAILED DESCRIPTION OF CERTAIN EMBODIMENTS

Figure 1:
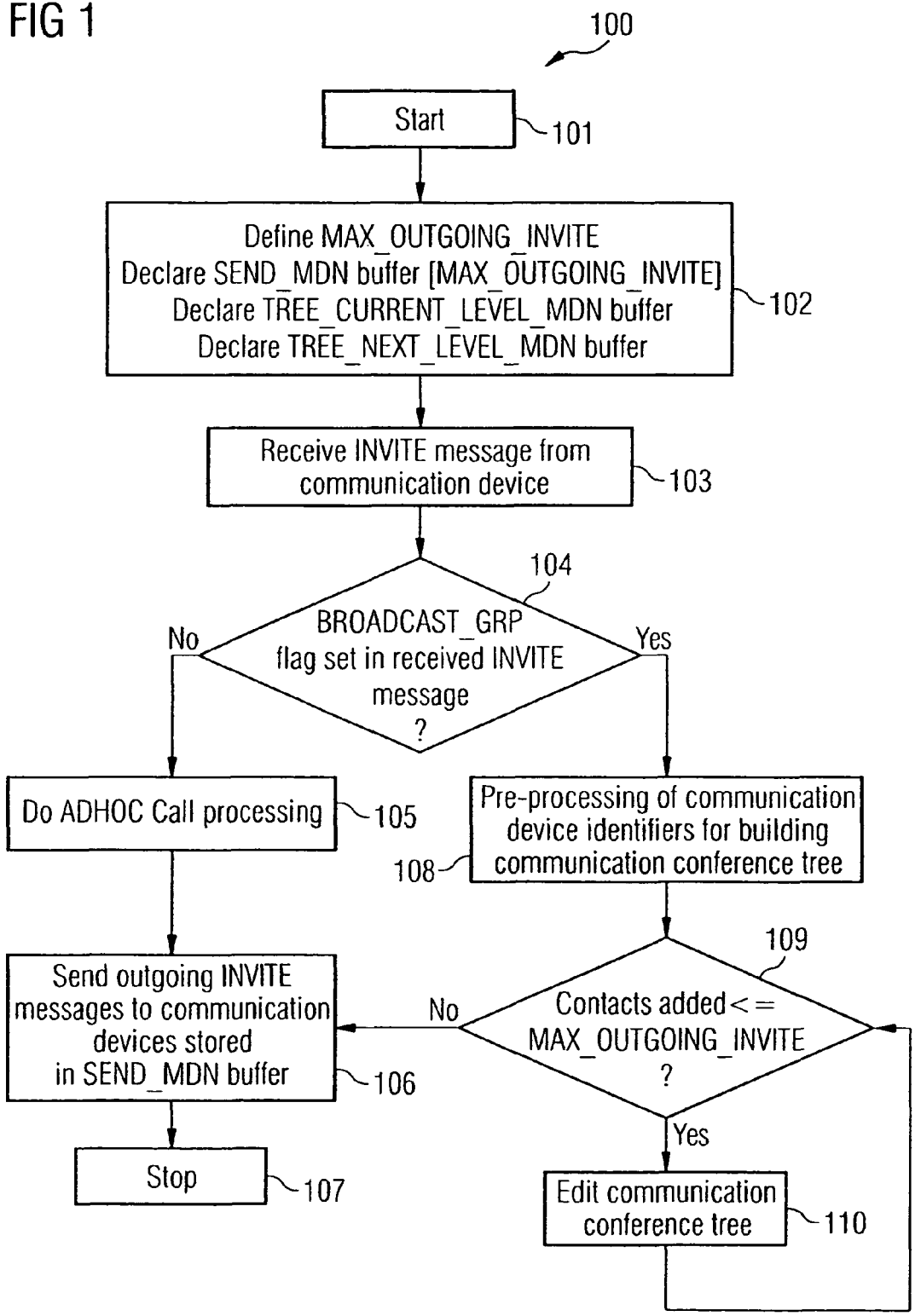
FIG. 1 shows a flow diagram illustrating a method in accordance with an exemplary embodiment of the invention.

In accordance with an exemplary embodiment of the invention, the second communication conference is a sub-communication conference of the first communication conference, in which all the participants of the first communication conference are also participants of the second communication conference.

Furthermore, the other communication conference may also be a sub-communication conference of an established communication conference, in which all the participants of the established communication conference are also participants of the other communication conference.

In accordance with another exemplary embodiment of the invention, the receiving of a plurality of communication device identifiers may be provided by means of a conference control protocol, for example by means of the Session Initiation Protocol (SIP). According to this exemplary embodiment of the invention, the receiving of a plurality of communication device identifiers may be provided by means of at least one Session Initiation Protocol INVITE message, for example in the REFER field of the Session Initiation Protocol INVITE message.

The plurality of communication device identifiers may comprise at least one individual communication device identifier and at least one group of a plurality of communication device identifiers.

The method may very advantageously be applied to a push-to-talk communication conference, for example to a mobile radio push-to-talk communication conference such as to the Push-to-Talk over Cellular (PoC) communication conference.

In accordance with yet another embodiment of the invention, providing a plurality of communication device identifiers of communication devices which are to be invited to at least one second communication conference, wherein the plurality of communication device identifiers may be provided by a communication device participating in an already established communication conference.

Furthermore, the plurality of communication device identifiers may be provided by a communication device participating in the first communication conference.

Moreover, the methods may be executed by a communication conference server, e.g. by a mobile radio base station or a mobile switching center (MSC), when applied to a GSM based system, e.g. when applied to a General Packet Radio System (GPRS), or by a NodeB or a Radio Network Controller (RNC), e.g. when applied to a UMTS system. However, it should be noted that the invention may be applied to any push-to-talk communication system, e.g. also the push-to-talk communication system "DirectConnect".

In an exemplary embodiment of the method for generating a communication conference tree used for inviting communication devices to a communication conference, may further comprise removing each of the communication device identifiers stored in the communication conference tree next level buffer which is already present in the communication conference tree, and adding each of the non-removed of communication device identifiers to a communication conference tree next level buffer.

Furthermore, the communication conference tree may be generated as a non-cyclic communication conference tree.

Figure 4:
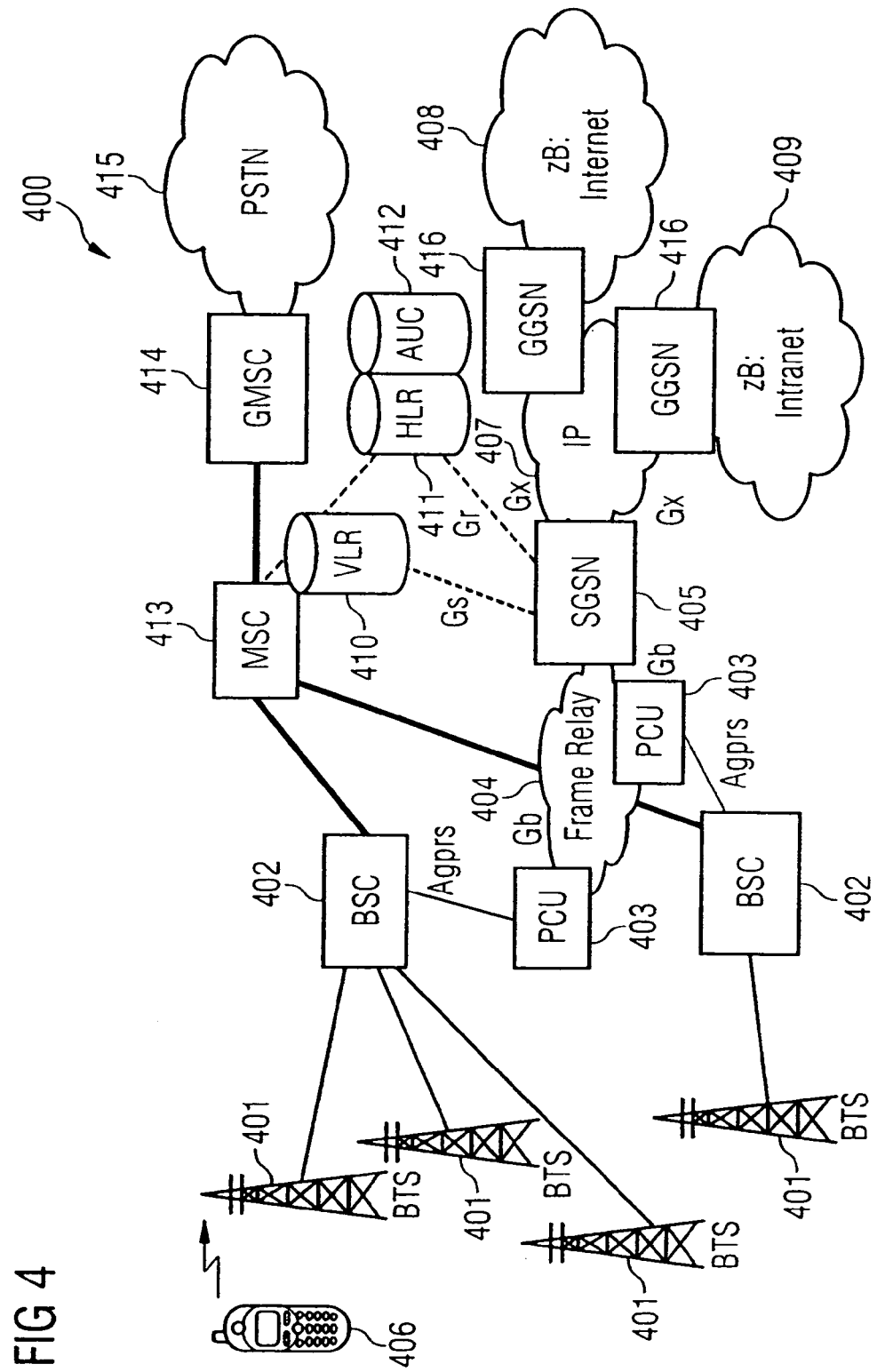
FIG. 4 shows a mobile radio communication system in accordance with an exemplary embodiment of the invention.

FIG. 4 shows a mobile radio communication system in accordance with an exemplary embodiment of the invention, e.g. a GPRS mobile radio communication system 400.

GPRS is not a completely separate network to GSM. Many of the devices used in the GPRS mobile radio communication system 400 are configured in the same way as in a GSM mobile radio communication system, e.g. base transceiver stations (BTS) 401 and base transceiver station controllers (BSC) 402 are used from a GSM communication system. There are a plurality of base transceiver station controllers 402 provided in the GPRS mobile radio communication system 400. In some cases, the GSM system components need to be upgraded by GPRS software and hardware in order to provide GPRS functionality. The hardware upgrade e.g. comprises adding a so called Packet Control Unit (PCU) 403. The PCU 403 is configured to differentiate data destined for the standard GSM communication network (e.g. Circuit Switched Data) and data destined for the GPRS communication network (e.g. Packet Switched Data). In some cases, a PCU 403 can be a separate entity, alternatively, the PCU 403 can be integrated within the BSC 402.

Furthermore, a Frame Relay connection 404 is provided in the upgraded BSC 402 that connects directly to a newly introduced Serving GPRS Support Node (SGSN) 405.

The SGSN 405 is configured to take care of some tasks including routing, handover and Internet Protocol (IP) address assignment. The SGSN 405 has a logical connection to the GPRS communication device 406. As an example, if the user of the GPRS communication device 406 travelled up a street on a long journey and browsed the Internet on the GPRS communication device 406, he or she would pass through many different mobile radio cells. One task of the SGSN 405 is to make sure that the connection is not interrupted as the GPRS communication device 406 is passing from cell to cell. The SGSN 405 determines which BSC 402 to "route" the connection through.

If the user of the GPRS communication device 406 and thus the GPRS communication device 406 moves into a segment of the communication network that is managed by a different SGSN, the SGSN 405 will not notice that this has happened. Any data packets that are lost during this process are re-transmitted. The SGSN 405 converts mobile data into the Internet Protocol (IP) format of the Internet and is connected to the Gateway GPRS Support Node (GGSN) 416 via a so called tunnelling protocol 407.

The GGSN 416 clearly represents the "last port of call" in the GPRS network before a connection between an Internet Service Provider (ISP) and a connection to the Internet 408 or to a corporate network's router for connection to the Intranet 409 occurs. The GGSN 416 is basically a Gateway, router and firewall usually integrated into one device. The GGSN 416 also confirms user details with Remote Authentication Dial-In User (RADIUS) servers for security, which are usually situated in the IP network and outside the GPRS network. The connection between the SGSN 405 and the GGSN 416 is provided by means of a protocol called GPRS Tunneling Protocol (GTP). GTP is provided on top (above) the TCP/IP protocol stack and is also responsible for the collection of mediation information and billing information. GPRS is usually billed on a per megabyte basis in contrast to GSM. The SGSN 405 and the GGSN 416 may be integrated within one single unit, in other words, in one single device.

The SGSN 405 is further coupled to the so called Visitor Location Register (VLR) 410, to the so called Home Location Register (HLR) 411 and to the so called Authentication Center (AUC) 412. The HLR 411 e.g. is a database that contains subscriber information, e.g. when a device connects to the network their Mobile Subscriber Integrated Services Digital Network Number/Mobile Device Number (MSISDN/MDN). The MSISDN/MDN is associated with communication services, account status information, preferences and sometimes also IP addresses.

The BSC 402 is furthermore connected to the Mobile Switching Center (MSC) 413, which is also connected to the VLR 410, HLR 411 and the AUC 412. The MSC 413 is also coupled to a Gateway Mobile Switching Center (GMSC) 414, which represents the Gateway to the public switched telephone network (PSTN) 415, thereby providing circuit switched communication services.

Figure 5:
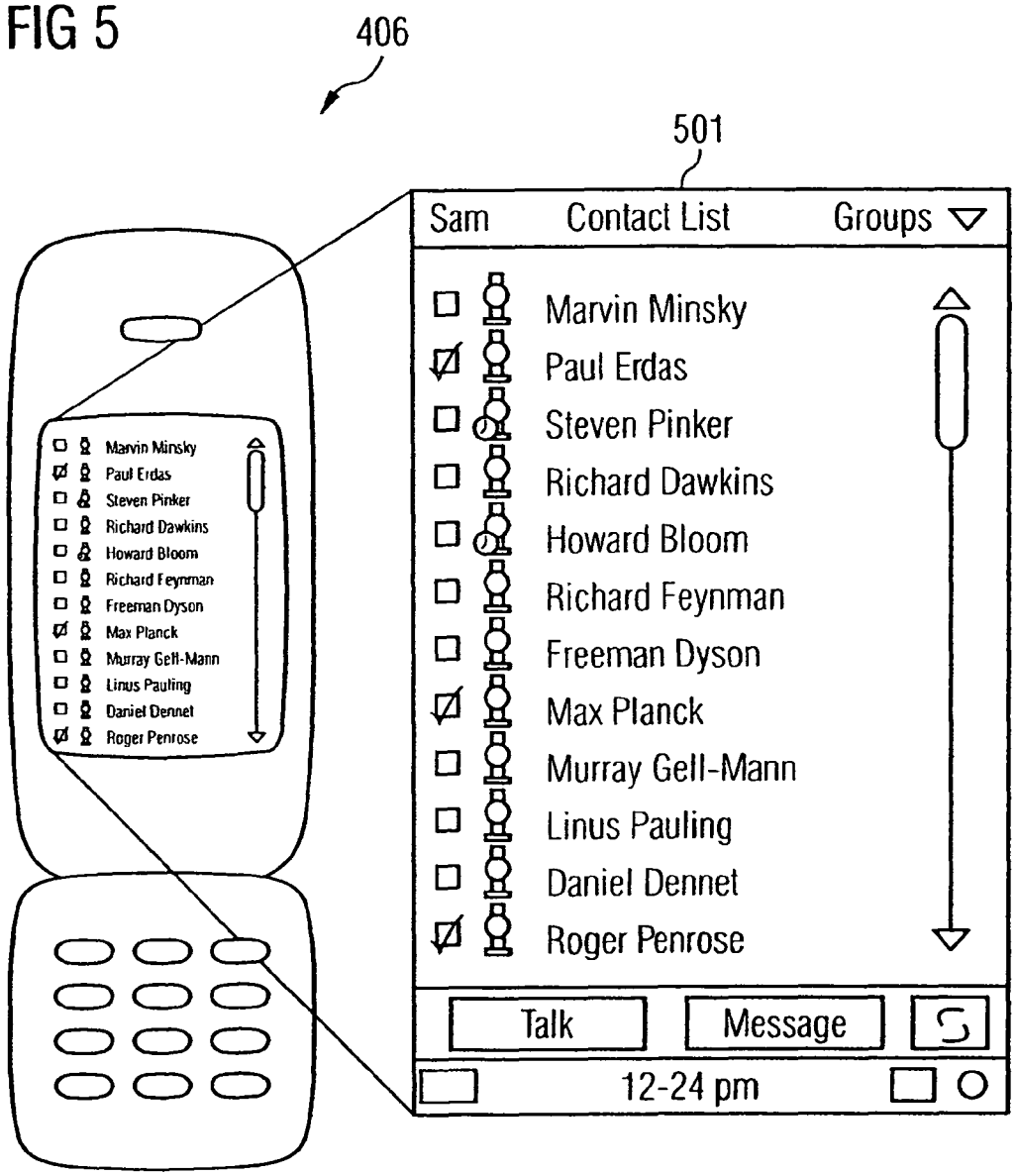
FIG. 5 shows a mobile radio communication device in accordance with an exemplary embodiment of the invention.

FIG. 5 shows a PoC communication device 406 in accordance with an exemplary embodiment of the invention.

PoC is a new "walky-talky" service (using the Session Initiation Protocol (SIP)) via mobile networks which simplifies communication with friends or at work and brings a new element of spontaneity to mobile communication. By way of example, PoC enables arranging last minute appointments between users, spreading information, coordinating tasks or simply staying in touch by merely pushing one PoC activation button on the PoC communication device 406.

PoC usually works as follows: First, the user of the first PoC communication device 406 selects the people he or she wants to talk to from a contact list 501. Upon pushing a special button, e.g. the PoC button, all of the previously selected and therewith defined addresses immediately receive an invitation message. The invited PoC communication devices can accept or decline the invitation.

In this context, the PoC communication device 406 generates and transmits a first SIP INVITE message 701 to the MSC 413 (see message flow diagram 700), which further includes a Session Initiation Protocol server. The SIP is a core protocol for establishing communication sessions in the Internet. Further, the SIP is a protocol that is provided over the IP network. The network layer protocol used is the Internet Protocol (IP) and the transport layer used is the User Datagram Protocol (UDP). SIP usually uses electronic mail style addressing to identify users, e.g. "02114204701@gateway-r-us.com". In addition or as an alternative, telephone numbers (e.g. the mobile device number, MDN) can also be used according to SIP, e.g. "+0811797677".

The first SIP INVITE message 701 has the general structure as shown in table 2:

TABLE 2

| Structure of first SIP INVITE message 701 | | |
| --- | --- | --- |
| Command name | Peer URI | Protocol version |
| | Call-ID: Field value | |
| | Via: Field value | |
| | From: Field value | |
| | To: Field value | |
| | Contact: Field value | |
| | Cseq: Field value | |
| | Content-Length: Field value | |
| | Max-Forward: Field value | |
| | Content-Type: Field value | |
| | Refer to: Contacts | |
| | SDP | |

The SIP message has a header including the "Command name", the "Peer URI" and the "Protocol version". Furthermore, the SIP message has a plurality of parameter lines. A line feed character distinguishes the command line, i.e. the header, and each parameter line. One of the parameter lines includes a description using the Session Description Protocol (SDP) for transporting session description information from the initiator (caller) to the callees.

As soon as the participants have confirmed the invitation to the first communication conference session, the initial caller pushes the PoC button (also referred to as Push and Talk button) and starts the chat, which everyone who has joined the first communication conference session hears simultaneously. There is no time-consuming call setup, because the "Always On" features of the GPRS/CDMA (Code Division Multiple Access) network maintains the connection active throughout the entire first communication conference session. Any user of an invited communication device can reply immediately by pressing the PoC button. The communication connection is a half-duplex connection, in other words, the communication can only be performed in one direction at a time. Any user who presses the respective PoC button first will receive the talk burst first and thus can talk first.

Figure 6:
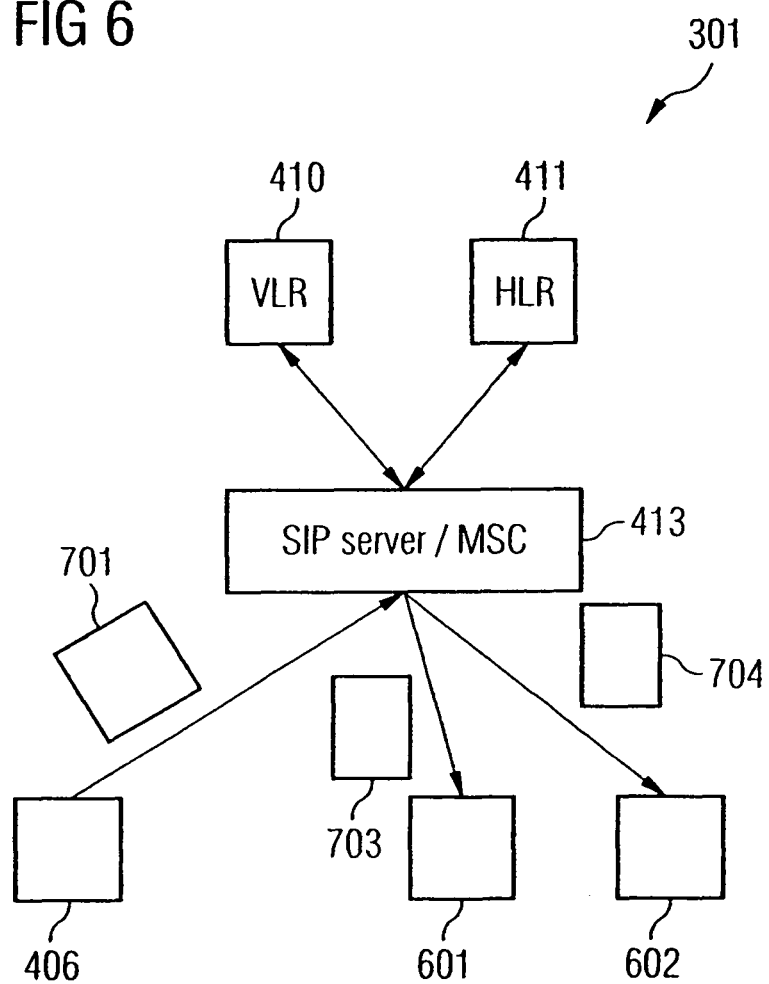
FIG. 6 shows a part of the push-to-talk mobile radio communication device of FIG. 4 with a plurality of PoC mobile radio communication devices in accordance with an exemplary embodiment of the invention.

FIG. 6 shows a part of the push-to-talk mobile radio communication device of FIG. 4 with a plurality of PoC mobile radio communication devices in accordance with an exemplary embodiment of the invention.

In this exemplary embodiment of the invention it is assumed that the first PoC mobile radio communication device 406 (the PoC mobile radio communication devices are also referred to as PoC devices) establishes a first PoC conference with the following additional PoC devices: a second PoC device 601 and a third PoC device 602.

Using the first SIP INVITE message 601, the first PoC device 406 invites the second PoC device 601 and the third PoC device 602.

Upon receipt of the first SIP INVITE message 601, the MSC 413 generates a SIP-100-TRYING message 702 and transmits it to the first PoC device 406 in order to inform it about the attempt of establishing the first PoC conference.

Furthermore, the MSC 413 generates a second SIP INVITE message 703 and a third SIP INVITE message 704. The second SIP INVITE message 703 is transmitted to the second PoC device 601 in order to invite the second PoC device 601 to the first PoC conference. Further, the third SIP INVITE message 704 is transmitted to the third PoC device 602 in order to invite the third PoC device 602 to the first PoC conference.

Upon receipt of the INVITE messages 703, 704, the second PoC device 601 and the third PoC device 602 generate and transmit to the MSC 413 a first SIP-180-RINGING message 705 and a second SIP-180-RINGING message 706, respectively. Upon receipt of the two SIP-180-RINGING.messages 705, 706, the MSC 413 generates a third SIP-180-RINGING message 707 and transmits it to the first PoC device 406.

If the users of the second PoC device 601 and the third PoC device 602 accept the invitation, they generate a first SIP-200-OK message 708 and a second SIP-200-OK message 709, respectively, and transmit them to the MSC 413. Further, the first PoC device 406 generates, upon receipt of the third SIP-180-RINGING message 707, a SIP-ACK-200-OK message 710 and transmits it to the MSC 413.

Figure 7:
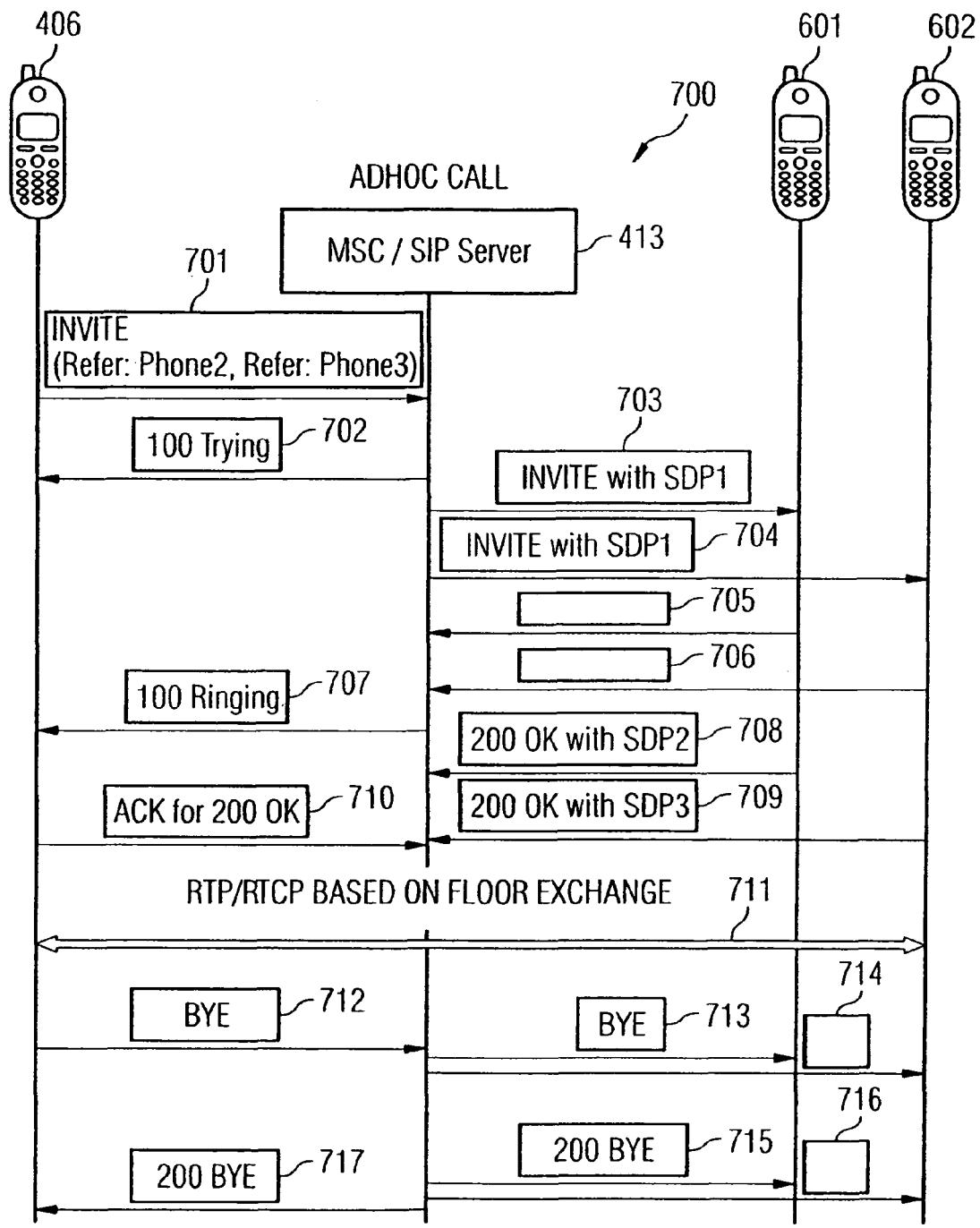
FIG. 7 shows a message flow diagram for establishing a push-to-talk communication conference connection in accordance with an exemplary embodiment of the invention.

After the first SIP-200-OK message 708, the second SIP-200-OK message 709 and the SIP-ACK-200-OK message 710 have been received by the MSC 413, the first PoC conference is established (symbolized in FIG. 7 by means of an arrow 711), and the PoC devices 406, 601, 602 can now exchange media data using the Real-Time Transport Protocol (RTP) and the Real-Time Transport Control Protocol (RTCP).

If the user of the first PoC device 406 wants to terminate the first PoC conference, the first PoC device 406 generates a first SIP-BYE message 712 and transmits it to the MSC 413, which generates a second SIP-BYE message 713 and transmits it to the second PoC device 601. Further, the MSC 413 generates a third SIP-BYE message 714 and transmits it to the third PoC device 602. Upon receipt of the second SIP-BYE message 713, the second PoC device 601 generates a first SIP-200-BYE message 715 and transmits it to the MSC 413. Furthermore, upon receipt of the third BYE message 714, the third PoC device 602 generates a second SIP-200-BYE message 716 and also transmits it to the MSC 413. Upon receipt of the two SIP-200-BYE message 715, 716, the MSC 413 generates a third SIP-200-BYE message 717 and transmits it to the first PoC device 406.

Figure 8:
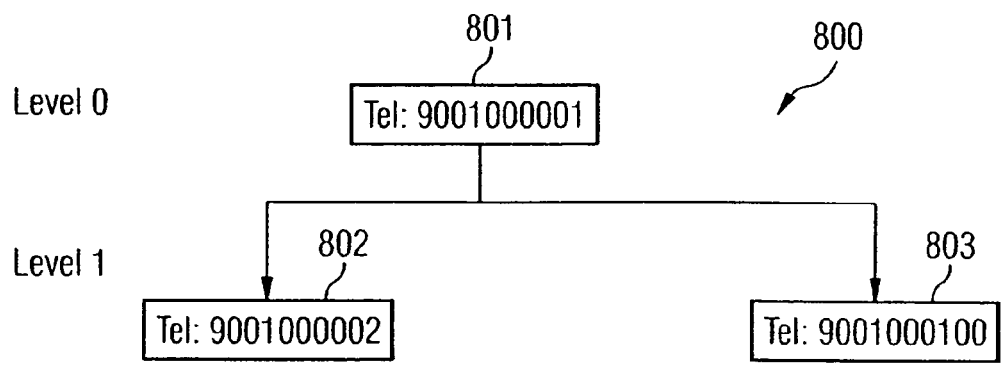
FIG. 8 shows a communication conference tree after the establishment of a first push-to-talk communication conference in accordance with an exemplary embodiment of the invention.

As shown in FIG. 8 and as will be described in more detail below, the MSC 413, upon receipt of the first SIP INVITE message 701, initializes a communication conference tree 800 used for inviting communication devices to a communication conference. The communication conference tree 800 is initialized with a root node 801 at tree level 0 comprising the MDN of the first PoC device 406. The communication conference tree 800 that will be generated is a non-cyclic tree. Furthermore, the MDN 802 of the second PoC device 601 and the MDN 803 of the third PoC device 602 are added at a level 1 to the communication conference tree 800.

Figure 9:
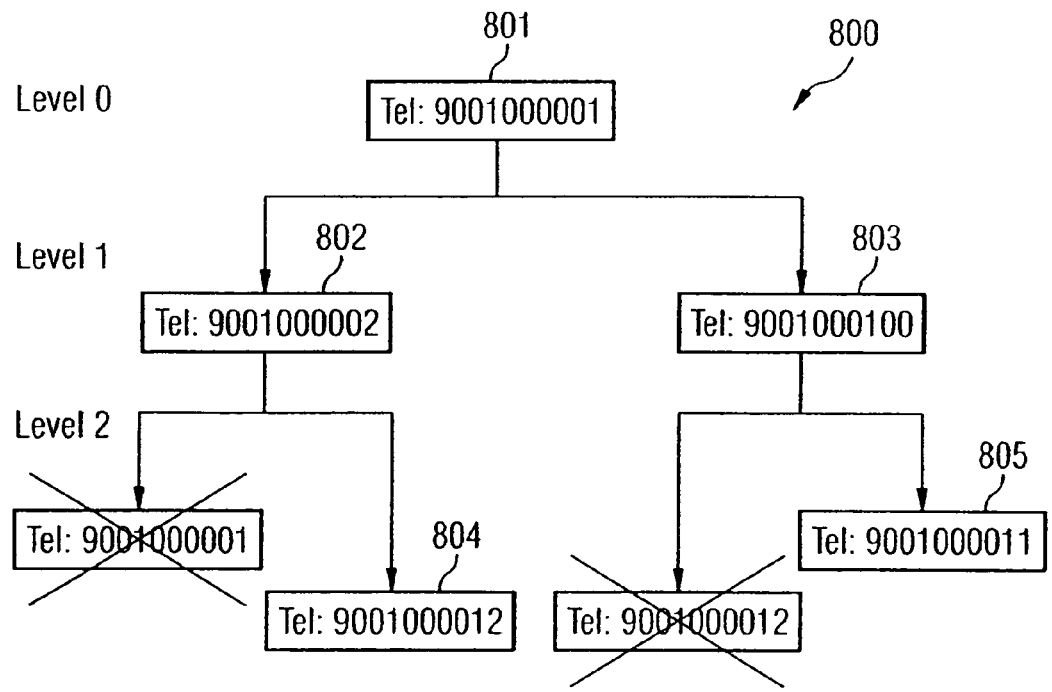
FIG. 9 shows a communication conference tree after the establishment of a second push-to-talk communication conference in accordance with an exemplary embodiment of the invention.

Further, in this exemplary embodiment of the invention it is assumed that during and within the established first PoC conference, the user of the second PoC device 601 wants to create a first PoC sub-conference of the first PoC conference, further referred to as second PoC conference. It is assumed that the user of the second PoC device 601 wants to invite a predefined first PoC group including the first PoC device 406 and a fourth PoC device (not shown). Thus, the second PoC device 601 generates a fourth SIP-INVITE message (not shown) including the information about the members of the first PoC group and transmits it to the MSC 413. The MSC 413, upon receipt of the fourth SIP-INVITE message, determines, using the communication conference tree 800, those PoC devices or their MDNs that are included in the first PoC group and that are already listed in the communication conference tree 800. The PoC device(s) that is (are) already in the communication conference tree 800, is (are) not added to the communication conference tree 800 and no INVITE message is generated for this (these) PoC device(s) (in this case the first PoC device 406, symbolized by a crossing out of the MDN of the first PoC device 406 in FIG. 9, left column). The MDN 804 of the fourth PoC device is added at a level 2 to the communication conference tree 800.

Further, in this exemplary embodiment of the invention it is assumed that during and within the established first PoC conference, the user of the third PoC device 602 wants to create a second PoC sub-conference of the first PoC conference, further referred to as third PoC conference. It is assumed that the user of the third PoC device 602 wants to invite a predefined second PoC group including the fourth PoC device and a fifth PoC device (not shown). Thus, the third PoC device 602 generates a fifth SIP-INVITE message (not shown) including the information about the members of the second PoC group and transmits it to the MSC 413. The MSC 413, upon receipt of the fifth SIP-INVITE message, determines, using the communication conference tree 800, those PoC devices or their MDNs that are included in the first PoC group and that are already listed in the communication conference tree 800. The PoC device(s) that is (are) already in the communication conference tree 800, is (are) not added to the communication conference tree 800 and no INVITE message is generated for this (these) PoC device(s) (in this case the fourth PoC device, symbolized by a crossing out of the MDN of the first PoC device 406 in FIG. 9, right column). The MDN 805 of the fifth PoC device is added at the level 2 to the communication conference tree 800.

Further, in this exemplary embodiment of the invention it is assumed that during and within the established second PoC conference, the user of the fourth PoC device wants to create a PoC sub-conference of the second PoC conference, further referred to as fourth PoC conference. It is assumed that the user of the fourth PoC device wants to invite a predefined third PoC group including the first PoC device 406, the third PoC device 602 and a sixth PoC device (not shown). Thus, the fourth PoC device generates a sixth SIP-INVITE message (not shown) including the information about the members of the third PoC group and transmits it to the MSC 413. The MSC 413, upon receipt of the sixth SIP-INVITE message, determines, using the communication conference tree 800, those PoC devices or their MDNs that are included in the third PoC group and that are already listed in the communication conference tree 800. The PoC device(s) that is (are) already in the communication conference tree 800, is (are) not added to the communication conference tree 800 and no INVITE message is generated for this (these) PoC device(s) (in this case the first PoC device 406 and the third PoC device 602, symbolized by a crossing out of the MDN of the first PoC device 406 in FIG. 10). The MDN 806 of the sixth PoC device is added at a level 3 to the communication conference tree 800.

The above exemplary embodiment has been described with a limited number of participants. However, in principle, an arbitrary number of participants and levels within the communication conference tree 800 can be involved in the embodiments of the invention.

Figure 2:
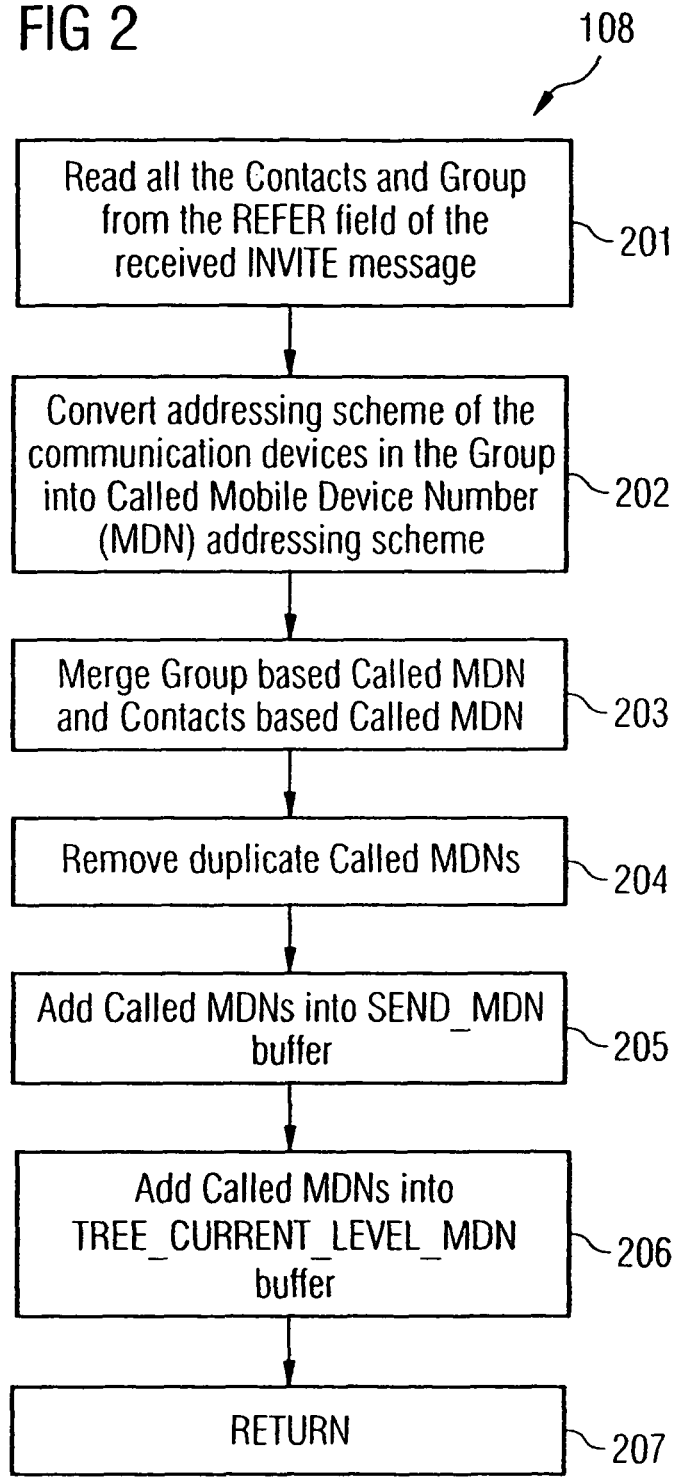
FIG. 2 shows a first partial flow diagram illustrating a step of the method shown in FIG. 1 in more detail.
Figure 3:
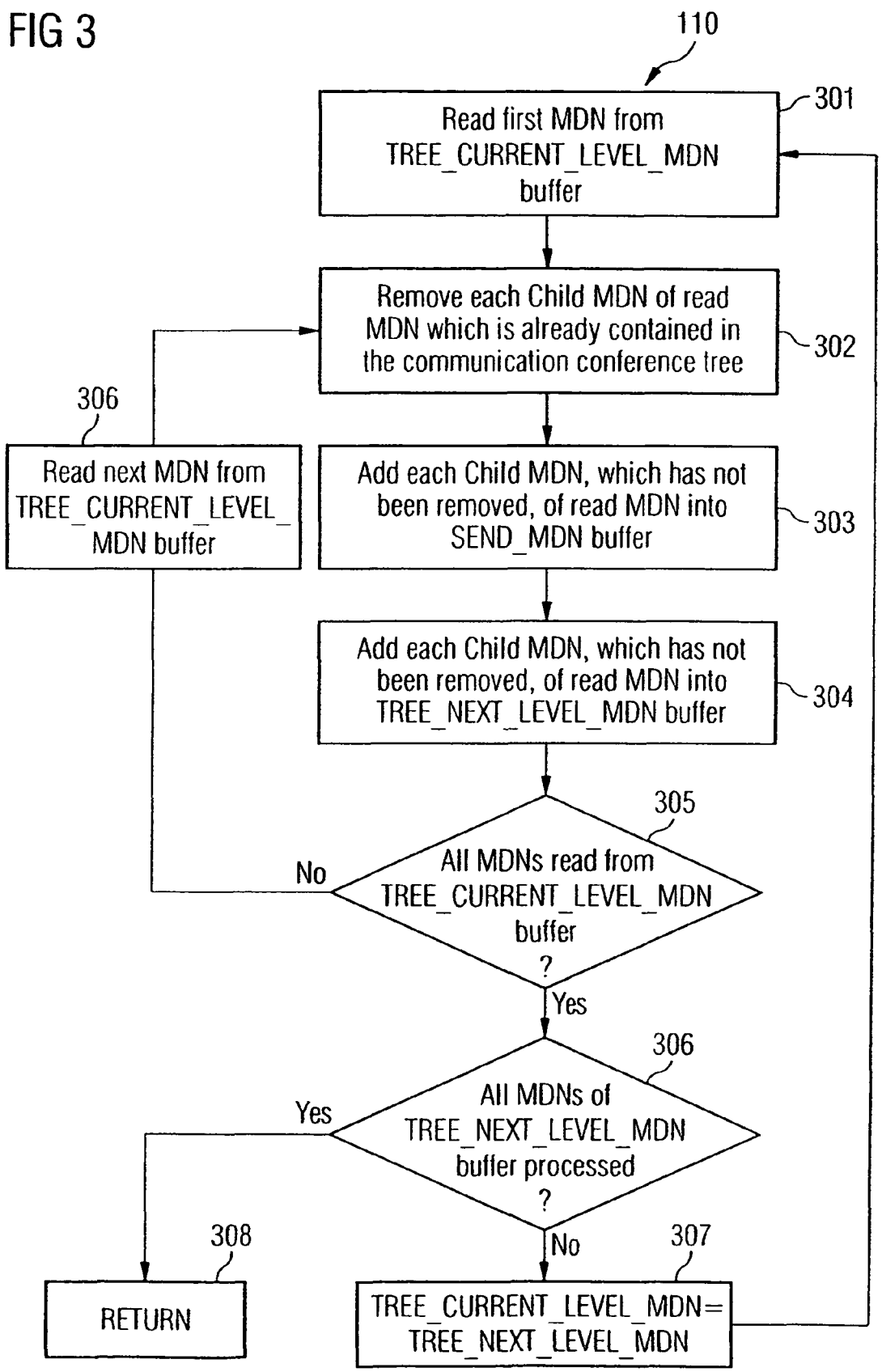
FIG. 3 shows a second partial flow diagram illustrating another step of the method shown in FIG. 1 in more detail.

Reference is now made to FIG. 1, FIG. 2 and FIG. 3 for an explanation of the general algorithm for a tree-based broadcasting service over push-to-talk mobile IP network in accordance with an exemplary embodiment of the invention in more detail.

The method is executed in the MSC 413.

After having started the method (step 101) (see flow diagram 100 in FIG. 1), the variable MAX_OUTGOING_INVITE is defined, which represents the maximum number of INVITE messages that can be sent within the conference session.

Further, the following variables are declared (step 102): SEND_MDN buffer [MAX_OUTGOING_INVITE], TREE_CURRENT_LEVEL_MDN buffer and TREE_NEXT_LEVEL_MDN buffer.

The variable SEND_MDN buffer [MAX_OUTGOING_INVITE] represents the size of the buffer for storing the orders for generating INVITE messages.

The variable TREE_CURRENT_LEVEL_MDN buffer represents the buffer for storing the MDNs of the level within the already generated communication conference tree 800 at which the editing will be started according to the method that will be explained in more detail below.

The variable TREE_NEXT_LEVEL_MDN buffer represents the buffer for storing the MDNs of the level within the already generated communication conference tree 800 that will be handled next after the current level has been finished, e.g. the level, at which the child MDNs of an MDN of the current level will be inserted into the communication conference tree 800.

After having received a SIP-INVITE message sent by a PoC device (step 103), the MSC 413 determines whether a BROADCAST-GRP flag, that is additionally provided in the SIP-INVITE message in accordance with an exemplary embodiment of the invention, is set in the received SIP-INVITE message (step 104).

The SIP-INVITE message contains the communication device identifiers of the communication devices (in this embodiment of the invention the PoC devices) that should be invited to the SIP conference session; they are usually stored in the REFER field of the SIP-INVITE message. The communication device identifiers can be stated as individual communication device identifiers (in the following also referred to as Contacts) or in form of groups of communication device identifiers (in the following also referred to as Groups). A Group can be understood to be a plurality (e.g. limited number) of PoC devices and their respective identifiers, e.g. that should be informed in a broadcast manner about news with regard to a specific topic, e.g. news or notices relating to education, fire, hospital, police, help-line, etc.

If the BROADCAST-GRP flag is not set in the received SIP-INVITE message ("No" in step 104), the standard ADHOC Call processing is executed (step 105), alternatively, the standard Point-to-Point Call processing is executed. Subsequently, SIP-INVITE messages are generated for each of the PoC devices requested in the received SIP-INVITE message and thus stored in the SEND_MDN buffer and the SIP-INVITE messages are sent to the respective PoC devices stored in the SEND_MDN buffer (step 106). The method ends in step 107.

If the BROADCAST-GRP flag is set in the received SIP-INVITE message ("Yes" in step 104), a pre-processing of the communication device identifiers for building and/or editing the communication conference tree 800 is performed (step 108).

The sub steps of the pre-processing are shown in a flow diagram of FIG. 2 and will be explained in more detail below.

In a first step 201, the MSC 413 reads all the Contacts and Groups from the REFER field of the INVITE message.

Next, the addressing scheme of the communication devices in the Groups are converted into a standard addressing scheme used in the communication conference tree 800 (step 202). According to this exemplary embodiment of the invention, the Mobile Device Number (MDN) addressing scheme is used in the communication conference tree 800. Thus, e.g. an electronic mail style address which may be used according to SIP would be converted into the MDN addressing scheme.

The then harmonized addresses are used in a step in which the Group based Called MDN and the Contacts based Called MDN are merged (step 203) and the duplicate (redundant) Called MDNs are removed (step 204).

Afterwards, the remaining Called MDNs are added into the SEND_MDN buffer (step 205) and the remaining Called MDNs are also added into the TREE_CURRENT_LEVEL_MDN buffer (step 206).

The sub-process returns to step 109 of the main process in step 207.

In step 109, the MSC 413 determines whether the number of Contacts or Group members, in other words the number of remaining MDNs, is smaller than or equal to the predetermined value of the variable MAX_OUTGOING_INVITE.

If the number of remaining MDNs is smaller than or equal to the predetermined value of the variable MAX_OUTGOING_INVITE ("Yes" in step 109), the communication conference tree 800 is edited by adding the respective MDNs (step 110) on an MDN-by-MDN basis and then the method is continued in step 109 again.

The sub steps of the editing of the communication conference tree 800 are shown in a flow diagram of FIG. 3 and will be explained in more detail below.

After having read the first MDN from the TREE_CURRENT_LEVEL_MDN buffer in step 301, each Child MDN of the read MDN, which is already contained in the communication conference tree 800, is removed (step 302). Further, each Child MDN of the read MDN, which has not been removed in step 302, is added into the SEND_MDN buffer (step 303) and into the TREE_NEXT_LEVEL_MDN buffer (step 304). Then, it is determined in step 305 whether all MDNs have been read from the TREE_CURRENT_LEVEL_MDN buffer.

If not all MDNs have been read from the TREE_CURRENT_LEVEL_MDN buffer yet ("No" in step 305), the next MDN contained in the TREE_CURRENT_LEVEL_MDN buffer is read and the method continues in step 302 for the newly read MDN.

If all MDNs have been read from the TREE_CURRENT_LEVEL_MDN buffer ("Yes" in step 305), in a following step, it is determined whether all MDNs that are stored in the TREE_NEXT_LEVEL_MDN buffer have been processed.

If not all MDNs that are stored in the TREE_NEXT_LEVEL_MDN buffer have been processed so far ("No" in step 306), the TREE_NEXT_LEVEL_MDN is assigned to the TREE_CURRENT_LEVEL_MDN (step 307) and the method continues in step 301 for the new TREE_CURRENT_LEVEL_MDN.

If all MDNs that are stored in the TREE_NEXT_LEVEL_MDN buffer have been processed ("Yes" in step 306), the sub-process returns to step 109 of the main process in step 308.

If the number of remaining MDNs is greater than the predetermined value of the variable MAX_OUTGOING_INVITE ("No" in step 109), the method continues in step 106 as described above.

In other words, the MSC 413 may implement a Breadth First Search (BFS) algorithm that is performed on the communication conference tree 800, wherein the BFS algorithm starts at a given vertex (node), which is at level 0 of the communication conference tree 800. In a first stage, all vertices at level 1 of the communication conference tree 800 are visited. In a second stage, all vertices at level 2 of the communication conference tree 800 are visited. These new vertices, which are adjacent to level 1 vertex, and so on. The BFS traversal terminates when each of the vertices of the communication conference tree 800 has been visited. Thus, the MSC 413 can implement the algorithms which can be used to find out the maximum possible number of Contacts, which can be derived from the incoming received SIP-INVITE message. The MSC 413 may contact the VLR 410 and the HLR 411 for database query in order to collect the required information about the PoC devices and their users.

In the following, some aspects of the above described exemplary embodiments of the invention are summarized:

Based on the PoC Consortium Phase 2 Specification for an ADHOC call, the user of a PoC device can call any number of Groups and Contacts together. This can be done by sending multiple Contacts and Groups in the REFER-TO field of the SIP-INVITE message.

A subscriber who wants to subscribe the tree-based broadcast service according to the exemplary embodiments of the invention as described above with the service provider will get another contact name, e.g. the name BROADCAST_GRP via a SIP-NOTIFY message (not shown) after the above mentioned service has been enabled.

In order to use the above described service, the subscriber might make a standard ADHOC with the addition of the contact BROADCAST_GRP, in other words with the addition of setting the new flag BROADCAST_GRP.

For the above call, the MSC 413 receives the SIP-INVITE message, in which the REFER-TO field will contain the requested contacts and Groups along with the BROADCAST_GRP contact number, in other words with the BROADCAST_GRP flag being set.

The methods according to the described embodiments of the invention are reliable and stable even in case of ever changing network structure.

The methods according to the described embodiments of the invention do not need any additional GPRS device, Handset changes or any changes in the geographical information.

The methods according to the described embodiments of the invention are based on rather simple algorithms that can be implemented in an existing SIP server residing in an MSC 413 rather easily.

The methods according to the described embodiments of the invention do not require any major changes in the communication protocols used.

According to an embodiment of the invention, a spanning tree (the communication conference tree) is maintained in the network and the broadcast service uses this tree by not forwarding a broadcast message (or multicast message) not to all neighbours, but only to those who are neighbours in this tree. Since the tree is acyclic, each message is received only once by each node, providing, e.g., the following two advantages. Firstly, it is now needless to store the previous broadcasts in order to avoid endless multiplications of the broadcast messages along a cycle of links. Only the originator node of a broadcast message needs to store it and pay attention as to whether its broadcast was probably successful or not if it is desired. Secondly, it is very economical considering how many times a broadcast message should be forwarded.

The new BROADCAST_GRP parameter may be stored in the Mobile contact list of a PoC device, for example. The service provider may decide as to whether the subscriber will be allowed to activate the above described service or not.

This is an example of the structure of an exemplary SIP-INVITE message in accordance with an embodiment of the invention:

INVITE tel: 8001000001@127.0.0.1:5060; User=phone SIP/2.0
Call-ID:01E04633512400000@127.0.0.1
...
...
Refer-to: tel: 8001000002
Refer-to: sip: 8001000003@infineon.com
Refer-to: Group_abc
Refer-to: Group_xyz
Refer-to: BROADCAST_GRP It should be mentioned that the invention is applicable to any Push-to-Talk system, e.g. to a OMA/3GPP/3GPP2 system or a PoC system according to an Agreement for Technology Cooperation for Push-to-Talk over Cellular (PoC) (the "Consortium Agreement") which was executed in June 2003 between the companies Ericsson, Motorola, Nokia, Siemens and AT & T Wireless Services, Inc.

While the invention has been shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are intended to be embraced.

What is claimed is:

1. A method for generating a plurality of messages for inviting communication devices to a communication conference, comprising:

establishing a first communication conference with a first plurality of communication devices, receiving a plurality of communication device identifiers from a communication device participating in the first communication conference, which communication device identifiers identify a second plurality of communication devices, determining communication devices from the second plurality of the communication devices, which are participating in the first communication conference, and generating messages for inviting communication devices to a second communication conference only for those communication devices of the second plurality which are not participating in the first communication conference.

2. A method for generating a plurality of messages for inviting communication devices to a communication conference, comprising:

receiving a plurality of communication device identifiers, which identify communication devices to be invited to a second communication conference, determining communication devices from the plurality of the communication devices, which are participating in a first communication conference, and generating messages for inviting communication devices to the second communication conference only for those communication devices which are not participating in the first communication conference.

3. The method as claimed in claim 1, wherein the second communication conference is a sub-communication conference of the first communication conference, in which all the participants of the first communication conference are also participants of the second communication conference.

4. The method as claimed in claim 2, wherein the second communication conference is a sub-communication conference of the first communication conference, in which all the participants of the first communication conference are also participants of the second communication conference.

5. The method as claimed in claim 2, wherein the plurality of received communication device identifiers are provided by via a conference control protocol.

6. The method as claimed in claim 5, wherein the plurality of received communication device identifiers are provided via the Session Initiation Protocol.

7. The method as claimed in claim 6, wherein the plurality of received communication device identifiers are provided via at least one Session Initiation Protocol INVITE message.

8. The method as claimed in claim 2, wherein the plurality of communication device identifiers comprise at least one individual communication device identifier and at least one group of communication device identifiers.

9. The method as claimed in claim 2, wherein the communication conferences comprise push-to-talk communication conferences.

10. The method as claimed in claim 2, wherein the communication conferences comprise mobile radio push-to-talk communication conferences.

11. The method as claimed in claim 1, further comprising providing the plurality of communication device identifiers, wherein the plurality of communication device identifiers is provided by a communication device participating in an already established communication conference.

12. ,The method as claimed in claim 11, wherein the plurality of communication device identifiers is provided by a communication device participating in the first communication conference.

13. The method as claimed in claim 2, wherein the method is executed by a communication conference server.

14. A device for generating a plurality of messages for inviting communication devices to a communication conference, comprising:
   a communication conference establishing unit configured to establish a first communication conference with a plurality of first communication devices,
   a receiver configured to receive a plurality of communication device identifiers from a communication device participating in the first communication conference, which communication device identifiers are configured to identify communication devices to be invited to at least a second communication conference,
   a determination unit configured to determine communication devices from the plurality of the communication devices, which are already involved in the first communication conference, and
   a message generating unit configured to generate messages for inviting communication devices to the second communication conference only for those communication devices which are not involved in the first communication conference.

15. A device for generating a plurality of messages for inviting communication devices to a communication conference, comprising:
   means for establishing a first communication conference with a plurality of first communication devices,
   means for receiving a plurality of communication device identifiers from a communication device participating in the first communication conference, which communication device identifiers identify communication devices to be invited to at least a second communication conference,
   means for determining communication devices from the plurality of the communication devices, which are already involved in the first communication conference, and
   means for generating messages for inviting communication devices to the second communication conference only for those communication devices which are not involved in the first communication conference.

16. A device for generating a plurality of messages for inviting communication devices to a communication conference, comprising:
   a receiver configured to receive a plurality of communication device identifiers, which identify communication devices to be invited to a second communication conference,
   a determination unit configured to determine communication devices from the plurality of the communication devices, which are already involved in a first communication conference, and
   a message generating unit configured to generate messages for inviting communication devices to the second communication conference only for those communication devices which are not involved in the first communication conference.

17. A device for generating a plurality of messages for inviting communication devices to a communication conference, comprising:
   means for receiving a plurality of communication device identifiers, which identify communication devices to be invited to a second communication conference,
   means for determining communication devices from the plurality of the communication devices, which are already involved in a first communication conference, and
   means for generating messages for inviting communication devices to the second communication conference only for those communication devices which are not involved in the first communication conference.

\* \* \* \* \*